Jan. 28, 1969 R. F. SCOTT ETAL 3,423,995
TESTING CONTAINER
Filed April 18, 1966
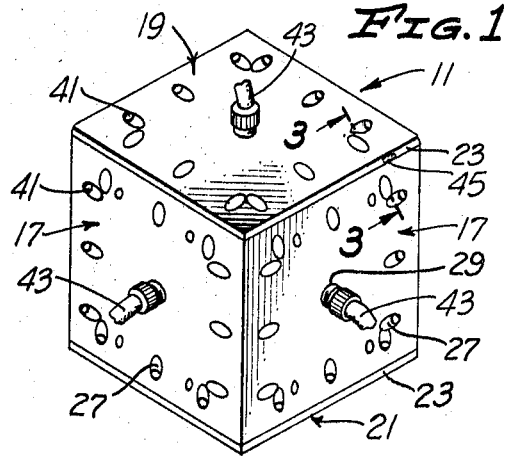
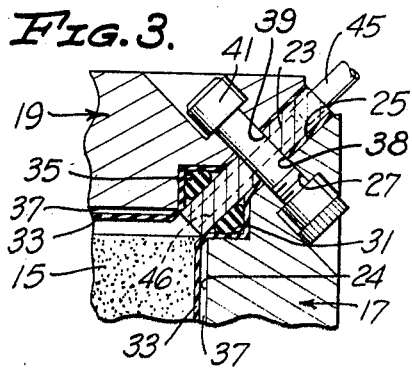
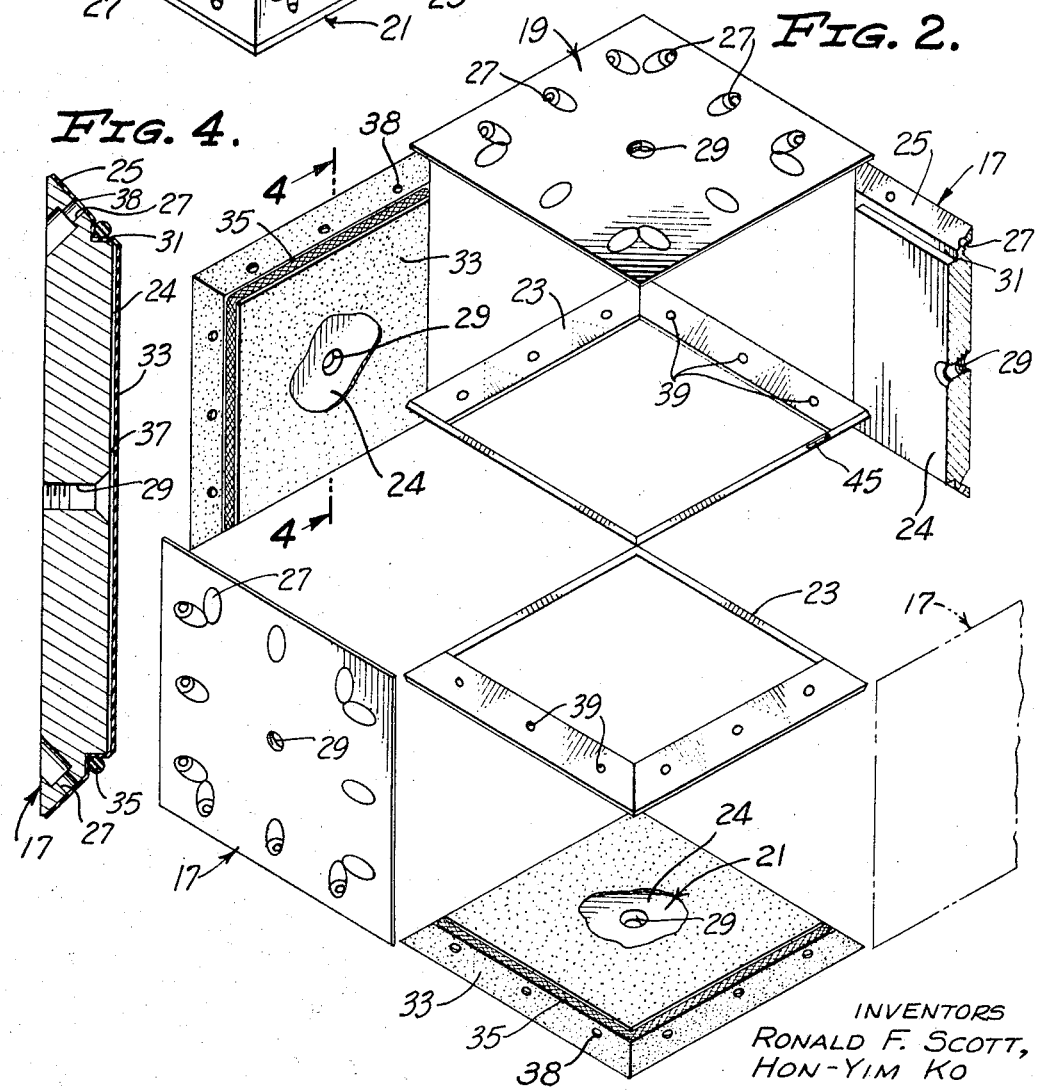
INVENTORS
RONALD F. SCOTT,
HON-YIM KO
BY THEIR ATTORNEYS
HARRIS, KIECH, RUSSELL & KERN з
United States Patent Office 3,423,995
Patented Jan. 28, 1969

3,423,995
TESTING CONTAINER
Ronald F. Scott, Altadena, and Hon-Yim Ko,
Pasadena, Calif., assignors to California Institute Research Foundation, Pasadena, Calif., a
corporation of California
Filed Apr. 18, 1966, Ser. No. 543,373
U.S. Cl. 73—94                              7 Claims
Int. Cl. G01n 3/10; B30b 5/02

ABSTRACT OF THE DISCLOSURE

A container for applying compression forces to samples, such as soil. A box having side plates and interior diaphragms, with the diaphragm edges clamped between the plate edges. Means for introducing fluid under pressure into the chamber between each side plate and adjacent diaphragm, permitting application of the same or different forces along each of three axes.

---

This invention relates to a novel testing container which is particularly adapted for the pressure testing of various materials such as soil.

In the testing of soil samples to determine their mechanical properties, it is conventional practice to determine how the soil reacts under pressure applied to opposite sides of the sample. The soil may compress, shift along some cleavage plane, or otherwise react to the pressure. Although several methods of testing are employed, the most common test involves a solid cylindrical soil sample with planar end faces. The sample is subjected to a hydrostatic pressure, and additional stresses are applied to the plane ends to cause the sample to deform. The variety of stress conditions which can be applied with this test is limited to those of axial symmetry.

The stresses are conventionally applied to the test specimen by mechanical devices or manual sequential adjustment of air pressure controls.

An object of this invention is to provide a novel soil testing container or device which automatically and simultaneously applies pressure to a test specimen therein along a plurality of disaligned axes.

Another object of this invention is to provide a novel testing device which simultaneously applies pressure to a test specimen therein along three mutually perpendicular axes.

A further object of this invention is to provide a testing device in which pressure may be applied in unequal amounts along three mutually perpendicular axes to a test specimen contained within the device.

It is an object of this invention to provide a testing container in which the variety of stress conditions which can be applied to the sample is not limited to those of axial symmetry.

Another object of this invention is to provide a sturdy fluid-tight testing device which is of simple construction.

A further object of this invention is to provide a soil testing device including a fluid-tight body having an interior wall surface defining a cavity, the interior wall surface having first and second wall surfaces at least partially defining the cavity, first and second resilient diaphragms adjacent the first and second wall surfaces respectively, and sealed to the interior wall surface to form therewith first and second chambers, respectively, when the diaphragms are spaced from their respective wall surfaces, and means for admitting fluid under pressure to the chambers and to apply compressive forces to a test specimen contained within the cavity.

Another object of this invention is to provide a testing device in which the body thereof includes a plurality of segments each of which has beveled peripheral edges, the segments being secured together along such pheripheral edges, and at least one resilient diaphragm overlying at least one of the segments, the edges of the diaphragm being clamped against the beveled edges of said one segment by the beveled edges of the adjacent segments.

The invention, both as to its organization and method of operation, together with further objects and advantages thereof, may best be understood by reference to the following description taken in connection with the accompanying drawings in which:

FIG. 1 is a perspective view of the testing container;
FIG. 2 is an enlarged exploded isometric view partially in section of the testing container, the central portions of two of the diaphragms being broken away to expose the fluid-admitting apertures;
FIG. 3 is an enlarged fragmentary sectional view taken along line 3—3 in FIG. 1 and showing the manner in which the adjacent segments are secured together; and
FIG. 4 is an enlarged sectional view taken along line 4—4 in FIG. 2 and showing the chamber formed by one of the plate-like segments and its associated diaphragm.

Referring to the drawings, a testing device or container 11, which is preferably cubical holds a test specimen such as a soil sample 15 (FIG. 3). Generally, the testing device 11 includes four plate-like side segments 17, a plate-like top segment 19, a plate-like bottom segment 21, and upper and lower peripheral or annular frames or segments 23. These segments are secured together as indicated in FIGS. 1–3 to form a substantially fluid-tight body. During construction, the frames 23 hold the four side plates 17 firmly together in correct alignment before the top and bottom plates 19 and 21 are added.

The segments 17, 19 and 21 are all substantially preferably identical, and accordingly only one of them is described in detail. The top and bottom segments 19 and 21 are slightly smaller than the side segments 17 because of the presence of the frames 23. The side segments 17 are preferably strong square metal plates having interior wall surfaces 24 with peripheral beveled edges 25. A plurality of bolt holes 27 is arranged around each segment 17 and the holes provide communication between the beveled edge 25 and the exterior surface of the segment to permit attachment of the segments to each other. A threaded fluid-admitting aperture or inlet 29 is located centrally in each segment 17 and provides means for admitting fluid under pressure to the interior of the testing container 11. An annular groove 31 having a square corner is formed in the beveled edge 25.

The segments 17, 19, and 21 are provided with identical pressure-responsive members or resilient diaphragms 33 of sheet rubber, metal, or flexible material overlying the beveled edges 25 and the interior wall surfaces 24. A resilient sealing band 35 holds a portion of each of the diaphragms 33 in the annular groove 31. As best seen in FIG. 4, the diaphragm 33 is movable away from at least a portion of the interior wall surface 24 to form a chamber 37 which is placed in communication with the exterior of the testing device 11 by the fluid-admitting aperture 29. Although the diaphragm 33 may contact the interior wall surface 24 when there is no fluid pressure acting thereon, it is necessary that the chamber 37 be formable at least in response to fluid under pressure so that such fluid can exert even pressure over the entire adjacent face of the test specimen. Holes 38 axially aligned with the hole 27 are provided in the diaphragm 33.

The frames 23 are sized and shaped to rest on the beveled edges 25 of the segments 17. The segments 19 and 21 rest on the upper and lower surfaces, respectively, of the upper and lower frames 23. The frames 23 have a plurality of bolt holes 39 arranged to cooperate with the bolt holes 27 in the segments 17, 19, and 21.

The testing device 11 is bolted together by a plurality of bolts 41 as indicated in FIGS. 1 and 3. The side segments 17 are bolted together with their respective resilient diaphragms 33 being held together in abutting relationship. The upper frame 23 rests on the upwardly facing portions of the beveled edges 25 of the side segments 17 as indicated in FIG. 3. Thus, the upper segment 23 separates the adjacent resilient diaphragms 33. In either event, however, the diaphragms 33 are clamped against the beveled edges of their respective segments by the adjacent segments 17, 19, and 21 and form a fluid-tight seal. Thus, six of the fluid-tight chambers 37 are formed, one for each of the segments 17, 19, and 21. The internal wall surfaces 24 of the segments form a cubical cavity and the portion of such cavity exclusive of the chambers 37 defines a specimen receiving space for receiving the sample 15 of soil or other material.

In use of the device, the top segment 19 may be removed, the sample 15 deposited in the specimen-receiving space, and the top segment 19 securely bolted to the side segments 17 through the frame 23. Fluid supply lines 43 may then be connected to each of the apertures 29. These supply lines 43 are preferably secured to a suitable source (not shown) of fluid under pressure. One suitable source for producing fluid under pressure is described in common assignee's copending application filed concurrently herewith and entitled "Testing Apparatus." By appropriate control of the fluid under pressure, fluid pressure is applied through the lines 43 and the aperture 29 to each of the chambers 37 to apply compressive forces to the test specimen 15. If the fluid is applied under sufficient pressure and the test specimen is compressible, the chambers 37 will enlarge, forcing the diaphragms 33 inwardly to reduce the volume of the specimen-receiving space. It is often desirable to admit equal fluid pressures to a pair of opposed chambers 37. However, depending upon the test being conducted, equal or different pressures may be admitted to the three sets or pairs of the chambers 37. Although the cavity in the soil testing box is preferably cubical and formed by the three pairs of opposed wall surfaces 24, other shapes may be employed if desired.

When the test specimen 15 contains a fluid such as air or water in the voids between the soil grains, the volume changes in the specimen may be observed by measuring the amount of water which enters or leaves the sample. To provide for the ingress or egress of air or water a small diameter line 45 (FIG. 3) is connected to an aperture or passageway 46 in the upper frame 23 leading to the specimen-receiving space. The soil-receiving space is preferably substantially fluid-tight except for the passageway 46.

If desired, volume changes in the sample 15 may be prevented in which case pressure develops in the fluid in the voids. The line 45 may be removed and a pressure gage (not shown) may be secured to the aperture 46 to provide readings on the pressure within the sample 15.

One of the primary features of this invention is that stress may be simultaneously applied to a test specimen along a plurality of disaligned axes. In the embodiment illustrated, this is accomplished by using three pairs of diaphragms which apply pressure to the specimen along three mutually perpendicular axes.

Many changes, modifications, and substitutions may be made by one having ordinary skill in the art without departing from the spirit and scope of the invention.

What is claimed is:

1. In a testing device for applying pressure to a test specimen, the combination of:

a body having an interior wall surface defining an internal cavity for receiving a test specimen, said body at least substantially completely enclosing said cavity, said interior wall surface having first and second disaligned substantially planar wall surfaces at least partially forming said cavity, said body being openable to provide access to said cavity from the exterior of said body;

pressure-applying means including first and second disaligned pressure-responsive flexible members in said cavity adjacent said first and second wall surfaces, respectively, for engaging the test specimen, said members being mounted for movement toward and away from their respective adjacent wall surfaces, each of said members having an inner face and an outer face, the inner faces of said members facing inwardly and the outer faces facing their respective adjacent wall surfaces, said first and second members being sealed to said interior wall surface and forming therewith first and second chambers, respectively, when said members are spaced from their respective adjacent wall surfaces, said inner faces at least partially defining a receiving space for receiving the test specimen;

said body including a plurality of interconnected segments, and said first member including a resilient diaphragm overlying one of said segments, the edges of said diaphragm being clamped against said one segment by the segments interconnected therewith;

first means for admitting fluid under pressure to said first chamber to force said first member inwardly to apply pressure to the test specimen along a first axis perpendicular to said first surface; and second means for admitting fluid under pressure to said second chamber to force said second member inwardly to apply pressure to the test specimen along a second axis perpendicular to said second surface.

2. A combination as defined in claim 1 wherein each of said segments has a peripheral edge, said segments being interconnected along said peripheral edges, and the edges of said diaphragm being clamped against said peripheral edge of said one segment by the peripheral edges of the adjacent segments to thereby seal said first member to said interior wall surface.

3. A combination as defined in claim 1 wherein said segments are plate-like segments, with each of said segments having a peripheral edge with a peripheral groove formed therein, said segments being interconnected along said peripheral edges, with said diaphragm overlying one of said segments and the peripheral groove thereof, the edges of said diaphragm being clamped against said peripheral edge of said one segment by the peripheral edges of the adjacent segments to form said first chamber; and a sealing band is provided for holding said diaphragm tightly against said groove.

4. A combination as defined in claim 1 wherein segments are plate-like segments, with each of said segments having beveled edges, said segments being interconnected along said beveled edges, the edges of said diaphragm being clamped against said beveled edges of said one segment by the beveled edges of adjacent segments to thereby seal said first member to said interior wall surface and form said first chamber.

5. A combination as defined in claim 1 wherein said body segments comprise six generally flat plates, each of said plates having beveled edges, said plates being connected along said beveled edges to define a generally cubical cavity, said pressure-applying means includes six of said members, each of said members includes a resilient diaphragm, each of said plates having one of said resilient diaphragms overlying the interior surface thereof, the edges of each of said diaphragms being clamped against the beveled edges of its respective plate to thereby seal each of said diaphragms to said interior wall surface and form one of said chambers for each of said plates, and said means for admitting fluid under pressure includes aperture means in each of said plates for admitting fluid under pressure to each of said chambers to apply a pressure to the test specimen from six different directions and to tend to force said diaphragms inwardly.

6. In a testing device for applying pressure to a test specimen, the combination of:
- a body having an interior wall surface defining an internal cavity for receiving a test specimen, said body at least substantially completely enclosing said cavity, said interior wall surface having first, second and third mutually perpendicular wall surfaces at least partially forming said cavity, said body being openable to provide access to said cavity from the exterior of said body;
- pressure-applying means including first, second and third pressure-responsive flexible members in said cavity adjacent said first, second and third wall surfaces, respectively, for engaging the test specimen, said members being mounted for movement toward and away from their respective adjacent wall surfaces, each of said members having an inner face and an outer face, the inner faces of said members facing inwardly and the outer faces facing their respective adjacent wall surfaces, said first, second and third members being sealed to said interior wall surface and forming therewith first, second and third chambers, respectively, when said members are spaced from their respective adjacent wall surfaces, said inner faces at least partially defining a receiving space for receiving the test specimen;
- first means for admitting fluid under pressure from a first source to said first chamber to force said first member inwardly to apply pressure to the test specimen along a first axis perpendicular to said first surface;
- second means for admitting fluid under pressure from a second source to said second chamber to force said second member inwardly to apply pressure to the test specimen along a second axis perpendicular to said second surface; and
- third means for admitting fluid under pressure from a third source to said third chamber to force said third member inwardly to apply pressure to the test specimen along a third axis perpendicular to said third surface, permitting independent application of the same and different forces along each of said axes.

7. A combination as defined in claim 6 wherein said interior wall surface includes three pairs of opposed wall surfaces and said pressure-applying means includes six of said members, each of said members including a diaphragm sealed to said interior wall surface to form one of said chambers for each of said opposed wall surfaces.

References Cited

FOREIGN PATENTS

| | | |
|---|---|---|
| 156,331 | 11/1963 | Russia. |
| 39,988 | 7/1957 | Poland. |
| 256,006 | 3/1949 | Switzerland. |
| 758,009 | 1962 | Russia. |

RICHARD C. QUEISSER, *Primary Examiner.*

JAMES W. WILLIAMSON, *Assistant Examiner.*